US010692254B2

(12) United States Patent
Yaeli et al.

(10) Patent No.: US 10,692,254 B2
(45) Date of Patent: Jun. 23, 2020

(54) SYSTEMS AND METHODS FOR CONSTRUCTING CLINICAL PATHWAYS WITHIN A GUI

(71) Applicant: INTERNATIONAL BUSINESS MACHINES CORPORATION, Armonk, NY (US)

(72) Inventors: Avi Yaeli, Ramot Menashe (IL); Peter Bak, Yokneam Ilit (IL); Adam Perer, Pittsburgh, PA (US); Shay Segal, Nesher (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 78 days.

(21) Appl. No.: 15/910,379

(22) Filed: Mar. 2, 2018

(65) Prior Publication Data
US 2019/0272654 A1    Sep. 5, 2019

(51) Int. Cl.
*G06F 17/20* (2006.01)
*G06T 11/20* (2006.01)
(Continued)

(52) U.S. Cl.
CPC ........ *G06T 11/206* (2013.01); *G06F 3/04847* (2013.01); *G06F 9/451* (2018.02); *G06F 16/9024* (2019.01); *G06T 2200/24* (2013.01)

(58) Field of Classification Search
None
See application file for complete search history.

(56) References Cited

U.S. PATENT DOCUMENTS 9,577,897 B2 * 2/2017 Dontcheva ............ H04L 43/045
10,303,719 B1 * 5/2019 Tan ...................... G06F 16/9024
(Continued)

OTHER PUBLICATIONS

Yang, Hongqiao et al, Knowledge-based clinical pathway for medical quality improvement, May 5, 2011, pp. 105-117 (Year: 2011).*
(Continued)

*Primary Examiner* — Shahid K Khan
(74) *Attorney, Agent, or Firm* — Michael Best & Friedrich LLP

(57) ABSTRACT

There is provided a method of creating a cohort clinical pathway graph based on knowledge-driven manual user input and automated data-driven mining comprising: receiving via a graphical user interface (GUI), manual selections including: knowledge-driven variable(s) denoting clinically significant values representing elements of a clinical decision making process, and an anchoring location of each knowledge-driven node denoting a respective knowledge-drive variable within a directed acyclic graph (DAG), computing individual clinical pathways for each of the sampled population of patients by automatically computing data-driven nodes denoting the data-driven discovery of event types relative to the manual selections, and aggregating the individual clinical pathways to compute a cohort clinical pathway DAG, wherein the cohort clinical pathway DAG includes nodes comprising the knowledge-driven nodes, the data-driven nodes, and links connecting the nodes, each link denoting an automatically discovered sequence between two respective nodes, and presenting the cohort clinical pathway DAG within the GUI.

20 Claims, 5 Drawing Sheets

(51) Int. Cl.
*G06F 3/0484* (2013.01)
*G06F 9/451* (2018.01)
*G06F 16/901* (2019.01)

(56) References Cited

U.S. PATENT DOCUMENTS

| | | | | |
|---|---|---|---|---|
| 2002/0107824 A1* | 8/2002 | Ahmed | ............... | G06N 5/04 |
| | | | | 706/46 |
| 2006/0241869 A1* | 10/2006 | Schadt | ............... | C12Q 1/6883 |
| | | | | 702/19 |
| 2007/0166707 A1* | 7/2007 | Schadt | ............... | C12Q 1/6827 |
| | | | | 435/6.11 |
| 2008/0222058 A1* | 9/2008 | Doctor | ............... | G16H 10/40 |
| | | | | 706/12 |
| 2010/0138368 A1* | 6/2010 | Stundner | ............ | G06N 20/00 |
| | | | | 706/12 |
| 2010/0324927 A1* | 12/2010 | Tinsley | ............... | G06F 19/325 |
| | | | | 705/2 |
| 2011/0125531 A1* | 5/2011 | Seare | ............... | G06F 19/328 |
| | | | | 705/3 |
| 2012/0041683 A1* | 2/2012 | Vaske | ............... | G16B 5/00 |
| | | | | 702/19 |
| 2012/0310667 A1* | 12/2012 | Altman | ............... | G06F 19/325 |
| | | | | 705/3 |
| 2012/0320923 A1* | 12/2012 | Vasseur | ............... | H04W 40/22 |
| | | | | 370/400 |
| 2013/0063460 A1* | 3/2013 | Marison | ............... | G06T 11/206 |
| | | | | 345/582 |
| 2013/0166317 A1* | 6/2013 | Beardall | ............... | G06F 19/324 |
| | | | | 705/2 |
| 2013/0197922 A1* | 8/2013 | Vesto | ............... | G06Q 50/22 |
| | | | | 705/2 |
| 2013/0246049 A1* | 9/2013 | Mirhaji | ............... | G06F 17/274 |
| | | | | 704/9 |
| 2013/0304499 A1* | 11/2013 | Rangadass | ............... | G06Q 10/06 |
| | | | | 705/2 |
| 2014/0025358 A1* | 1/2014 | Hill | ............... | G16B 5/00 |
| | | | | 703/2 |
| 2014/0040301 A1* | 2/2014 | Chadha | ............... | G06F 16/2462 |
| | | | | 707/765 |
| 2014/0088988 A1* | 3/2014 | Fairbrothers | ......... | G06F 19/325 |
| | | | | 705/2 |
| 2014/0257847 A1* | 9/2014 | Hu | ............... | A61B 5/7282 |
| | | | | 705/3 |
| 2014/0267287 A1* | 9/2014 | Dodgen | ............... | G06T 11/206 |
| | | | | 345/440 |
| 2014/0278517 A1* | 9/2014 | Patel | ............... | G06Q 50/22 |
| | | | | 705/2 |
| 2014/0297240 A1 | 10/2014 | Duftler et al. | | |
| 2014/0358581 A1* | 12/2014 | Sudharsan | ............ | G06N 7/005 |
| | | | | 705/2 |
| 2015/0066524 A1* | 3/2015 | Fairbrothers | ......... | G16H 50/20 |
| | | | | 705/2 |
| 2015/0081701 A1* | 3/2015 | Lerios | ............... | H04L 43/045 |
| | | | | 707/736 |
| 2015/0161346 A1 | 6/2015 | Hu et al. | | |
| 2016/0210421 A1* | 7/2016 | Matsumasa | ............ | G06Q 50/22 |
| 2016/0232457 A1* | 8/2016 | Gray | ............... | G06T 11/206 |
| 2016/0357720 A1* | 12/2016 | Thimbleby | ............ | G06F 3/1454 |
| 2017/0039491 A1* | 2/2017 | Gauthier | ............... | G06Q 10/067 |
| 2017/0132357 A1* | 5/2017 | Brewerton | ............ | G16H 50/50 |
| 2017/0132383 A1* | 5/2017 | Myers | ............... | G06F 19/00 |
| 2017/0185721 A1* | 6/2017 | Schuck | ............... | G06F 3/0481 |
| 2017/0199959 A1* | 7/2017 | Locke | ............... | G16B 30/00 |
| 2018/0039399 A1* | 2/2018 | Kaltegaertner | ..... | G06F 3/04817 |
| 2018/0046780 A1* | 2/2018 | Graiver | ............... | G16H 10/60 |
| 2018/0060396 A1* | 3/2018 | Johnson | ............... | G06F 16/9024 |
| 2018/0114126 A1* | 4/2018 | Das | ............... | G06F 16/35 |
| 2018/0181676 A1* | 6/2018 | Khandelwal | ............ | G06F 16/13 |
| 2018/0181720 A1* | 6/2018 | Ensey | ............... | G06F 19/3418 |
| 2018/0276040 A1* | 9/2018 | Hosmani | ............... | G06F 9/4881 |
| 2018/0300280 A1* | 10/2018 | Suzuki | ............... | G06F 9/50 |
| 2018/0322149 A1* | 11/2018 | Vermeulen | ............ | G06F 16/21 |
| 2019/0005395 A1* | 1/2019 | Dutkowski | ............ | G06N 5/022 |
| 2019/0065671 A1* | 2/2019 | Yandell | ............... | G16B 20/00 |
| 2019/0074082 A1* | 3/2019 | Buckler | ............... | G06F 17/2785 |
| 2019/0090744 A1* | 3/2019 | Mahfouz | ............... | A61B 6/461 |

OTHER PUBLICATIONS

Iwata et al., "Construction of Clinical Pathway based on Similarity-based Mining in Hospital Information System," Procedia Computer Science, 2014, 31:1107-1115.

Perer et al., "Mining and exploring care pathways from electronic medical records with visual analytics," Journal of Biomedical Informatics, 2015, 56:369-378.

Zhang et al., "Paving the COWpath: Learning and visualizing clinicalpathways from electronic health record data," Journal of Biomedical Informatics, 2015, 58:186-197.

\* cited by examiner

SYSTEMS AND METHODS FOR CONSTRUCTING CLINICAL PATHWAYS WITHIN A GUI

BACKGROUND

The present invention, in some embodiments thereof, relates to graphical user interfaces (GUI) and, more specifically, but not exclusively, to systems and methods for GUIs for constructing clinical pathways.

Clinical Pathways define the essential components of complex care processes in healthcare. For example how a doctor should best treat a congestive heart failure (CHF) patient based on existing patient conditions, past treatments, comorbidities, and treatment options.

SUMMARY

According to a first aspect, a computer-implemented method of creating a cohort clinical pathway graph based on knowledge-driven manual user input and automated data-driven mining within a graphical user interface (GUI) presented on a display associated with a computing device, comprises: receiving, via the GUI a plurality of manual selections including: at least one knowledge-driven variable denoting clinically significant values representing elements of a clinical decision making process, and an anchoring location of each knowledge-driven node denoting a respective knowledge-drive variable within a directed acyclic graph (DAG), computing individual clinical pathways for each of the sampled population of patients by automatically computing data-driven nodes denoting the data-driven discovery of event types relative to the plurality of manual selections, and aggregating the individual clinical pathways to compute a cohort clinical pathway DAG, wherein the cohort clinical pathway DAG includes a plurality of nodes comprising the knowledge-driven nodes, the data-driven nodes, and links connecting the plurality of nodes, each link denoting an automatically discovered sequence between two respective nodes, and presenting the cohort clinical pathway DAG within the GUI.

According to a second aspect, a system for creating a cohort clinical pathway graph based on knowledge-driven manual user input and automated data-driven mining within a graphical user interface (GUI) presented on a display associated with a computing device, comprises: a non-transitory memory having stored thereon a code for execution by at least one hardware processor of the computing device, the code comprising: code for receiving, via the GUI a plurality of manual selections including: at least one knowledge-driven variable denoting clinically significant values representing elements of a clinical decision making process, and an anchoring location of each knowledge-driven node denoting a respective knowledge-drive variable within a directed acyclic graph (DAG), code for computing individual clinical pathways for each of the sampled population of patients by automatically computing data-driven nodes denoting the data-driven discovery of event types relative to the plurality of manual selections, and code for aggregating the individual clinical pathways to compute a cohort clinical pathway DAG, wherein the cohort clinical pathway DAG includes a plurality of nodes comprising the knowledge-driven nodes, the data-driven nodes, and links connecting the plurality of nodes, each link denoting an automatically discovered sequence between two respective nodes, and code for presenting the cohort clinical pathway DAG within the GUI.

According to a third aspect, a computer program product for creating a cohort clinical pathway graph based on knowledge-driven manual user input and automated data-driven mining within a graphical user interface (GUI) presented on a display associated with a computing device, comprising: a non-transitory memory having stored thereon a code for execution by at least one hardware processor of the computing device, the code comprising: instructions for receiving, via the GUI a plurality of manual selections including: at least one knowledge-driven variable denoting clinically significant values representing elements of a clinical decision making process, and an anchoring location of each knowledge-driven node denoting a respective knowledge-drive variable within a directed acyclic graph (DAG), instructions for computing individual clinical pathways for each of the sampled population of patients by automatically computing data-driven nodes denoting the data-driven discovery of event types relative to the plurality of manual selections, and instructions for aggregating the individual clinical pathways to compute a cohort clinical pathway DAG, wherein the cohort clinical pathway DAG includes a plurality of nodes comprising the knowledge-driven nodes, the data-driven nodes, and links connecting the plurality of nodes, each link denoting an automatically discovered sequence between two respective nodes, and instructions for presenting the cohort clinical pathway DAG within the GUI.

The systems, methods, and/or code instructions described herein relate to the technical problem of providing a GUI for improving the efficiency of developing clinical pathways. Developing clinical pathways is a very complex and cumbersome process, which requires integration of knowledge and/or collaboration from many stakeholders (e.g., clinical researchers, doctors, nurses, and staffs in hospitals) as well as from the literature. Manual only methods are ineffective, since a human is unable to adequately analyze the vast quantity of data stored in patient health records. Automatic data mining approaches result in a large amount of data that may generate a very large graph, which is difficult to clearly present and/or summarize for presentation on a display. The large amount of data is difficult to navigate and/or understand. In addition clinical pathways tend to cover only a small portion of the most common cases that have enough knowledge foundation behind them and for which the stakeholders agree on the best treatment.

The systems methods, and/or code instructions described herein provide a GUI that combines knowledge-driven (i.e., manually entered data) and data-driven approaches (i.e., automatically discovered data) for constructing clinical pathways, which is novel and non-obvious in view of other attempted approaches. For example, other attempts based on data-driven approaches produce models which reflect only the available data processed by the code, and the created visual layout is oriented towards the primary analysis technique. The created visual layout is not aligned with the mental model of how physicians think of diagnosis and treatment and/or is not aligned with how healthcare providers perform their work in accordance with existing medical guidelines.

The systems, methods, and/or code instructions described herein do not simply display information using a GUI. The systems, methods, and/or code instructions described herein may be based on a specific, structured GUI, which is paired with a prescribed functionality directly related to the GUI's structure that is addressed to and resolves the specifically identified technical problem. For example, computing data-driven nodes relative to the manually defined initial node, final node, and anchored knowledge-driven nodes reduces the complexity and/or clutter of a graph that would otherwise include irrelevant nodes and/or links, for example, a graph created by a fully automated discovery process.

The systems, methods, and/or code instructions described herein improve performance of a computing device (e.g., client terminal, server), for example, by reducing processor utilization, reducing processing time, reducing data traffic over a network, and/or reducing data storage requirements. Improvement may occur, for example, by the manual selection of the clinical state parameter(s), the clinical outcome parameter(s), the knowledge-driven variable(s), and/or the anchoring location(s) of the knowledge-driven nodes corresponding to the knowledge-driven variable(s). The manual selections improve performance of the computing device by reducing the processing resources for computing of the DAG. The manual selections reduces the space of possible computed combinations and/or reduce degrees of freedom of the automated data-driven discovered process, for example, in comparison to a fully automated data discovery process that would require significantly more processing resources for computation of a larger number of nodes and/or links based on a much larger number of possible combinations.

The systems, methods, and/or code instructions described herein improve an underlying technical process within the technical field of graphical user interfaces.

The systems, methods, and/or code instructions described herein are tied to physical real-life components, including a display presenting the GUI, and physical user interfaces for entering data used to create the chart within the GUI and/or dynamically navigate the chart presented within the GUI.

In a further implementation form of the first, second, and third aspects, a Sankey-based diagram is computed according to the cohort clinical pathway DAG, and presented within the GUI.

In a further implementation form of the first, second, and third aspects, a height of a respective node and/or link of the cohort clinical pathway DAG corresponds to a relative number of sub-set of patients of the sampled population having individual pathways passing through the respective node and/or link.

In a further implementation form of the first, second, and third aspects, the links are color coded according to a color coding scheme denoting the relative ratio of the sampled population meeting a certain clinical outcome value of the clinical outcome variable.

In a further implementation form of the first, second, and third aspects, the method further comprises and/or the system further comprises code instructions for and/or the computer program product further comprises additional instructions for, receiving, via the GUI one or both of the following manual selections: at least one clinical state parameter denoting an initial clinical state of a sample population of patients, at least one clinical outcome parameter denoting a final state of at least one patient of the sample population, wherein the at least one clinical state parameter denotes an initial root node of the DAG, and the at least one outcome parameter denotes a final leaf node of the DAG, wherein the plurality of nodes of the cohort clinical pathway DAG comprise the initial root node, and the final leaf node.

In a further implementation form of the first, second, and third aspects, the at least one clinical state parameter, the at least one clinical outcome parameter, and the at least one knowledge-driven variable are denoted as one or more conditions of values of entries stored in electronic health records of patients.

In a further implementation form of the first, second, and third aspects, the at least one clinical state parameter, the at least one clinical outcome parameter, and the at least one knowledge-drive variable are computed based on data stored in one or more of: electronic health records of a population of patients, medical insurance claims of the population of patients, and billing data of the population of patients.

In a further implementation form of the first, second, and third aspects, the method further comprises and/or the system further comprises code instructions for and/or the computer program product further comprises additional instructions for, computing a visual diagram based on the cohort clinical pathway DAG for presentation within the GUI by: traversing the cohort clinical pathway DAG depth first, and assigning the computed depth to each respective node, presentation within the GUI, an arrangement of clusters of nodes, wherein each cluster includes nodes of a common depth, presenting within the GUI, the links between the plurality of nodes at each cluster.

In a further implementation form of the first, second, and third aspects, the computed depth includes one or both of: a fixed depth value indicative of the last knowledge-driven node encountered in the cohort clinical pathway DAG for the respective node, and a variable depth value indicative of depth between knowledge-driven nodes.

In a further implementation form of the first, second, and third aspects, intermediate nodes of the cohort clinical pathway DAG denote the data-driven discovered event types, and links between nodes denote data-driven discovered sequences between event types denoted by the linked nodes.

In a further implementation form of the first, second, and third aspects, links and/or nodes of the cohort clinical pathway DAG are associated with statistics computed based on the individual pathways from which the links and/or nodes were aggregated from.

In a further implementation form of the first, second, and third aspects, the statistics include at least one of: number of individual patients of the sampled to population associated with the respective link and/or node, and a measure of central tendency computed for a value associated with the respective link and/or node associated with the sub-set of patients.

In a further implementation form of the first, second, and third aspects, the aggregating comprises: computing unique sequences of nodes based on the individual clinical pathways, computing the number of patients for each discovered unique sequence, and aggregating patient level metrics for each unique sequence.

In a further implementation form of the first, second, and third aspects, the method further comprises and/or the system further comprises code instructions for and/or the computer program product further comprises additional instructions for, receiving via the GUI, a manual designation indicative of automated data-driven discovery of events at least one of: before, after, and in-between knowledge-driven nodes of the at least one knowledge-driven variables, wherein the automatically computing the data-driven discovery of events is performed according to the manual designation.

In a further implementation form of the first, second, and third aspects, the method further comprises and/or the system further comprises code instructions for and/or the computer program product further comprises additional instructions for receiving via the GUI, a manual collapse instruction, and aggregating the data-driven event type nodes of the cohort clinical pathway DAG to create a collapsed cohort clinical pathway DAG depicting direct flows between the knowledge-driven nodes.

In a further implementation form of the first, second, and third aspects, nodes of individual clinical pathway are associated with timestamps indicative of time of occurrence of the event represented by the respective node, wherein the individual clinical pathway are aggregated to compute the cohort clinical pathway DAG according to the timestamps.

In a further implementation form of the first, second, and third aspects, the data-driven discovery of events is implemented based on temporal sequence mining of electronic health records of the sample population of patients.

In a further implementation form of the first, second, and third aspects, data-driven nodes represent data selected from the group comprising: a medical drug-based treatment, a medical intervention procedure, and a certain clinical state.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
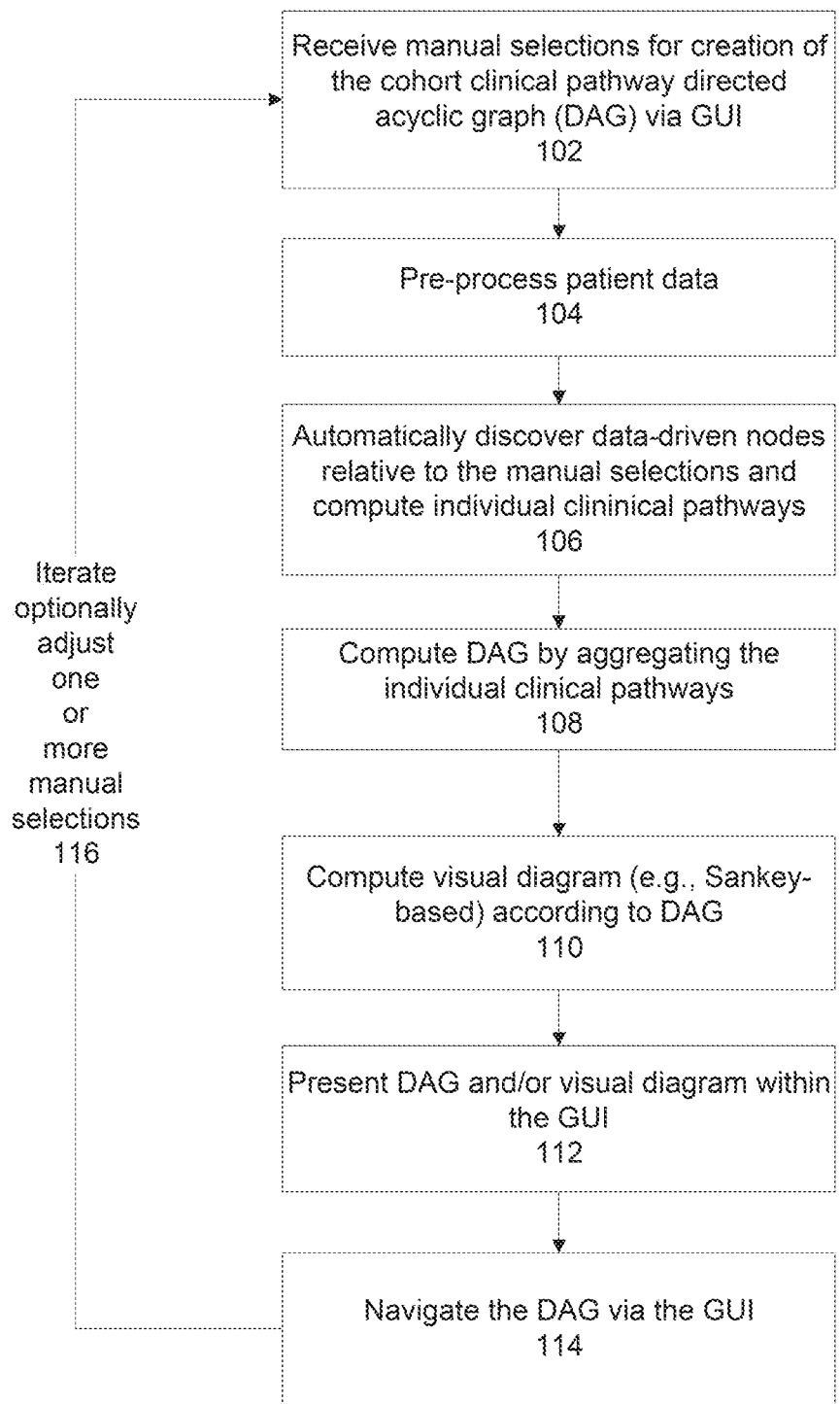
FIG. 1 is a flowchart of a method of creating a cohort clinical pathway graph based on knowledge-driven manual user input and automated data-driven mining within a graphical user interface (GUI) presented on a display associated with a computing device, in accordance with some embodiments of the present invention.

The present invention, in some embodiments thereof, relates to graphical user interfaces (GUI) and, more specifically, but not exclusively, to systems and methods for GUIs for constructing clinical pathways.

An aspect of some embodiments of the present invention relates to systems, an apparatus, methods, and/or code instructions (stored in a data storage device and executable by one or more hardware processors) for creating a cohort clinical pathway graph (i.e., a directed acyclic graph (DAG)) based on manually entered knowledge-driven input and automatically discovered data-driven data within a GUI presented on a display. One or more of the following are manually entered via the GUI: clinical state parameter(s) denoting an initial clinical state of a sample population of patients, clinical outcome parameter(s) denoting a final state of at least one patient of the sample population, and one or more knowledge-driven variables denoting clinically significant values representing elements of a clinical decision making process. An initial node(s) of the DAG stores data associated with the clinical state parameter(s). A final node(s) of the DAG stores data associated with the clinical outcome parameter(s). Knowledge-driven nodes storing data associated with each of the knowledge-driven variables are located between the initial and final nodes, according to anchoring locations manually entered via the GUI. Individual clinical pathways are computed for each patient of the sample populations based on automatically computed data-driven nodes storing event types automatically discovered by the data-driven discovery process relative to the manually entered selections. The individual clinical pathways are aggregated to compute the cohort clinical pathway DAG. The cohort clinical pathway DAG includes multiple nodes: the initial node(s), the final node(s), the knowledge-driven nodes, and the data-driven node(s). The multiple nodes are connected by automatically created links computed based on automatically discovered sequences between two respective nodes. The cohort clinical pathway DAG is presented within the GUI. The cohort clinical pathways DAG may be adjusted and/or navigated.

Optionally, a Sankey-based diagram is computed based on the cohort clinical pathway DAG for presentation within the GUI. A height of each respective node and/or links between nodes may correspond to a relative number of a sub-set of patients of the sampled population having individual pathways passing through the respective node and/or link. The links may be color coded according to a color coding scheme denoting the relative ratio of the sampled population meeting a certain clinical outcome value of the clinical outcome variable. The nodes may be clustered according to a common depth relative to the initial node, where nodes of a common depth are located at a common distance away from the initial node, for example, stacked along a vertical axis relative along a horizontal axis denoting depth.

The systems, methods, and/or code instructions described herein relate to the technical problem of providing a GUI for improving the efficiency of developing clinical pathways. Developing clinical pathways is a very complex and cumbersome process, which requires integration of knowledge and/or collaboration from many stakeholders (e.g., clinical researchers, doctors, nurses, and staffs in hospitals) as well as from the literature. Manual only methods are ineffective, since a human is unable to adequately analyze the vast quantity of data stored in patient health records. Automatic data mining approaches result in a large amount of data that may generate a very large graph, which is difficult to clearly present and/or summarize for presentation on a display. The large amount of data is difficult to navigate and/or understand. In addition clinical pathways tend to cover only a small portion of the most common cases that have enough knowledge foundation behind them and for which the stakeholders agree on the best treatment.

The systems methods, and/or code instructions described herein provide a GUI that combines knowledge-driven (i.e., manually entered data) and data-driven approaches (i.e., automatically discovered data) for constructing clinical pathways, which is novel and non-obvious in view of other attempted approaches. For example, other attempts based on data-driven approaches produce models which reflect only the available data processed by the code, and the created visual layout is oriented towards the primary analysis technique. The created visual layout is not aligned with the mental model of how physicians think of diagnosis and treatment and/or is not aligned with how healthcare providers perform their work in accordance with existing medical guidelines.

The systems, methods, and/or code instructions described herein do not simply display information using a GUI. The systems, methods, and/or code instructions described herein may be based on a specific, structured GUI, which is paired with a prescribed functionality directly related to the GUI's structure that is addressed to and resolves the specifically identified technical problem. For example, computing data-driven nodes relative to the manually defined initial node, final node, and anchored knowledge-driven nodes reduces the complexity and/or clutter of a graph that would otherwise include irrelevant nodes and/or links, for example, a graph created by a fully automated discovery process.

The systems, methods, and/or code instructions described herein improve performance of a computing device (e.g., client terminal, server), for example, by reducing processor utilization, reducing processing time, reducing data traffic over a network, and/or reducing data storage requirements. Improvement may occur, for example, by the manual selection of the clinical state parameter(s), the clinical outcome parameter(s), the knowledge-driven variable(s), and/or the anchoring location(s) of the knowledge-driven nodes corresponding to the knowledge-driven variable(s). The manual selections improve performance of the computing device by reducing the processing resources for computing of the DAG. The manual selections reduces the space of possible computed combinations and/or reduce degrees of freedom of the automated data-driven discovered process, for example, in comparison to a fully automated data discovery process that would require significantly more processing resources for computation of a larger number of nodes and/or links based on a much larger number of possible combinations.

The systems, methods, and/or code instructions described herein improve an underlying technical process within the technical field of graphical user interfaces.

The systems, methods, and/or code instructions described herein are tied to physical real-life components, including a display presenting the GUI, and physical user interfaces for entering data used to create the chart within the GUI and/or dynamically navigate the chart presented within the GUI.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
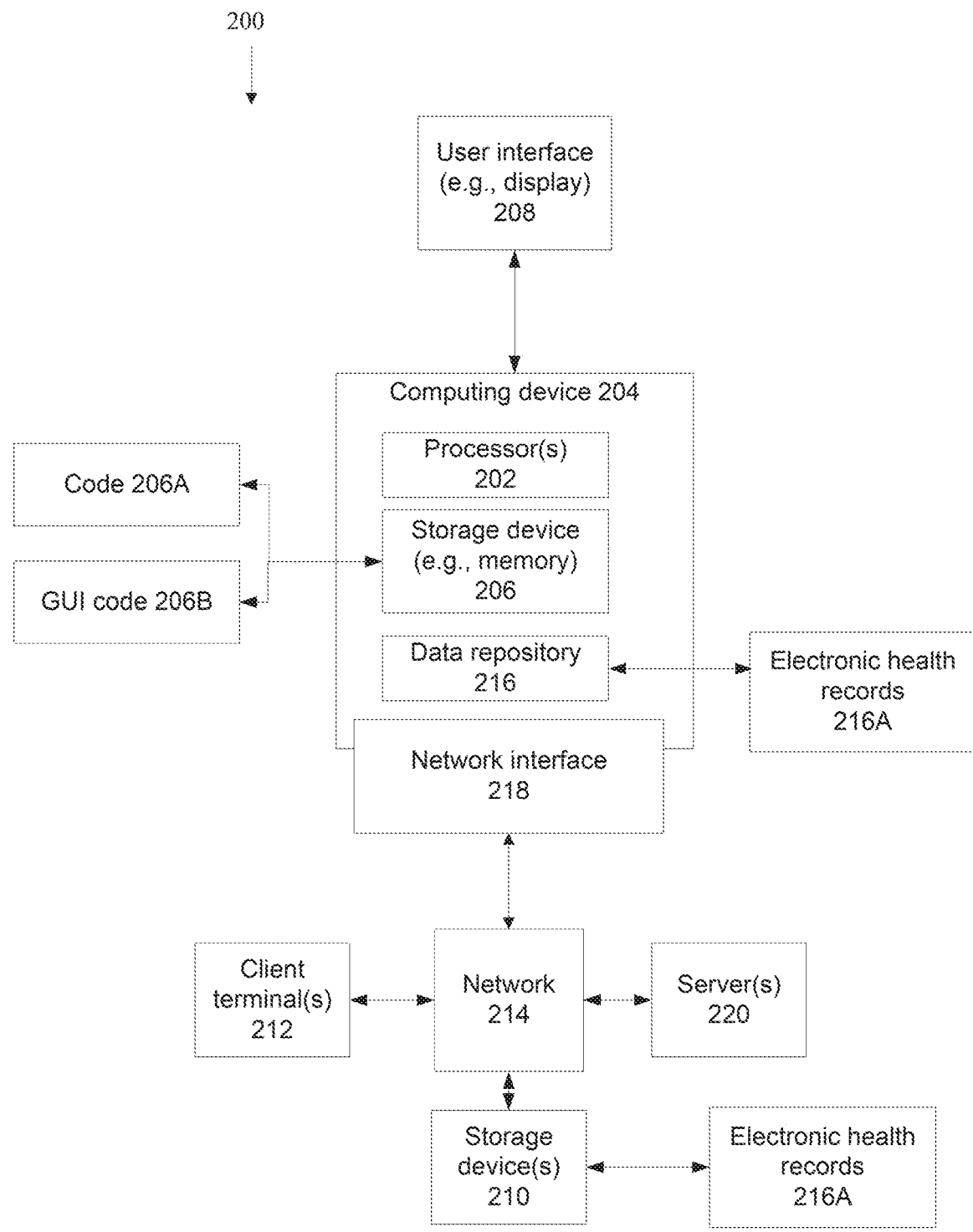
FIG. 2 is a block diagram of components of a system for creation of the cohort clinical pathway graph based on the knowledge-driven manual input and automated data-driven mining, in accordance with some embodiments of the present invention.

Reference is now made to FIG. 1, which is a flowchart of a method of creating a cohort clinical pathway graph based on knowledge-driven manual user input and automated data-driven mining within a graphical user interface (GUI) presented on a display associated with a computing device, in accordance with some embodiments of the present invention. Reference is also made to FIG. 2, which is a block diagram of components of a system 200 for creation of the cohort clinical pathway graph based on the knowledge-driven manual input and automated data-driven mining, in accordance with some embodiments of the present invention. System 200 may implement the acts of the method described with reference to FIG. 1, by processor(s) 202 of a computing device 204 executing code instructions stored in a storage device 206 (also referred to as a program store).

Computing device 204 may be implemented as, for example, a client terminal, a server, a computing cloud, a virtual machine, a mobile device, a desktop computer, a thin client, a Smartphone, a Tablet computer, a laptop computer, a wearable computer, glasses computer, and a watch computer.

Multiple architectures of system 200 based on computing device 204 may be implemented. For example, computing device 204 may include locally stored software (e.g., code 206A) that performs one or more of the acts described with reference to FIG. 1, for example, as a client terminal. In another exemplary implementation, computing device 204 storing code 206A, may be implemented as one or more servers (e.g., network server, web server, a computing cloud, a virtual server) that provides services (e.g., one or more of the acts described with reference to FIG. 1) to one or more client terminals 212 over a network 214, for example, providing software as a service (SaaS) to the client terminal(s) 212, providing software services accessible using a software interface (e.g., application programming interface (API), software development king (SDK)), providing an application for local download to the client terminal(s) 212, and/or providing functions using a remote access session to the client terminals 212, such as through a web browser.

Processor(s) 202 of computing device 204 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 202 may include a single processor, or multiple processors (homogenous or heterogeneous) arranged for parallel processing, as clusters and/or as one or more multi core processing devices.

Data storage device 206 stores code instructions executable by processor(s) 202, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Storage device 206 stores code 206A that implements one or more features and/or acts of the method described with reference to FIG. 1 when executed by processor(s) 202. Storage device 206 stores GUI code 206B that presents the computed DAG, and/or includes a mechanism for a user to manually enter data for creation of the DAG, as described herein.

Computing device 204 may include a data repository 216 for storing data, for example, electronic health records 216A storing patient health data for creation of the chart, as described herein. Data repository 216 may be implemented as, for example, a memory, a local hard-drive, virtual storage, a removable storage unit, an optical disk, a storage device, and/or as a remote server and/or computing cloud (e.g., accessed using a network connection).

Network 214 may be implemented as, for example, the internet, a local area network, a wireless network, a cellular network, a local bus, a point to point link (e.g., wired), and/or combinations of the aforementioned.

Computing device 204 may include a network interface 218 for connecting to network 214, for example, one or more of, a network interface card, a wireless interface to connect to a wireless network, a physical interface for connecting to a cable for network connectivity, a virtual interface implemented in software, network communication software providing higher layers of network connectivity, and/or other implementations. Computing device 204 may connect using network 214 (or another communication channel, such as through a direct link (e.g., cable, wireless) and/or indirect link (e.g., via an intermediary computing unit such as a server, and/or via a storage device) with one or more of:

Remote servers 220 and/or storage devices 210 to access one or more electronic health records 216A stored thereon. For example, to increase the amount of available data for analysis, for example, of a rare cohort of patients. It is noted that electronic health records 216A is provided as a not necessarily limiting example, as other data sources may be utilized, for example, data indicative of medical insurance claims for the population, and/or billing data for the population.

Client terminal(s) 212 (which may include server(s)), for example, when client terminal(s) 212 remotely access computing device 204 implemented as a server remotely providing the features and/or acts described with reference to FIG. 1.

Computing device 204 and/or client terminal(s) 212 include and/or are in communication with one or more physical user interfaces 208 that include a mechanism for a user to enter data (e.g., performing the manual selections described herein, adjust the graph, and/or collapse links as described herein) and/or view the displayed GUI. Exemplary user interfaces 208 include, for example, one or more of, a touchscreen, a display, a keyboard, a mouse, and voice activated software using speakers and microphone.

Referring now back to FIG. 1, at 102, manual selections are received by computing device 204. The manual selections are optionally received via a GUI (e.g., implemented by GUI code 206B executed by processor(s) 202 of computing device 204) presented on display 208. For example, the manual selections may be made by a user scrolling through a list of available data and manually clicking on desired data for selection, by a user manually entering text to search for matching data, and/or a user manually touching icons representing available data.

Manual selections include one or more of:

Clinical state parameter(s) defining an initial state of a sampled population of patients. The sampled population is selected from the population of patients (e.g., having stored health records) according to the selected clinical state parameter(s). For example, diagnosis of congestive heart failure (CHF), patients entering an emergency room with a diagnosis of chest pain, or a value of a (optionally validated) medical instrument scale above a score threshold (e.g., Glasgow coma scale, pain scale, and mini mental status exam), and a score indicative of a bleeding state at a predefined time post admission. The clinical pathway graph is computed for the sampled population, as described herein.

Clinical outcome parameter(s) defining a final state experienced by at least one of the sampled population of patients. For example, a complication of a stroke, death, discharge, admission to ICU, return to baseline function. The clinical outcome parameter(s) may be defined according to a time interval relative to the time at which the initial state of the sampled population is determined. For example, 1 year from the initial state. The clinical outcome parameter(s) may include an indication of patient state at the time interval, for example, patient diagnosis at 1 year from the initial state, patient complications 1 year from the initial state, and patients that died at 1 year from the initial state.

Knowledge-driven variable(s) denoting clinically significant values representing elements of a clinical decision making process. These are variables that are manually selected by the user, for example, according to perceived clinical relevance by the user, and/or according to a clinical question that the user is researching, and/or other subjective reasons. For example, the knowledge-driven variable(s) denote an administered medical treatment (e.g., drug-based, surgery, physical intervention procedure), and/or a clinical state (e.g., change in mini mental status score, hemoglobin level). The knowledge-driven variable(s) may denote clinically significant events that the user is interested in understanding. For example, of the patients entering the emergency room with a diagnosis of chest pain, the sub-set that was treated with intervention placement of a cardiac stent. The knowledge-driven variable(s) may denote a change in value and/or state, for example, of a certain data entry of the patient health record. For example, a change in GLASGOW coma scale values, a new diagnosis, removal of an existing diagnosis, and/or change of medication. The knowledge-driven variable(s) may be defined as occurring within a certain time interval and/or occurring during a time interval relative to the initial state, for example, a change in diagnosis occurring 24 hours post emergency room admission, changes in antibiotic treatments over a 72 hour period.

Optionally, the knowledge-driven variable(s) are manually selected, and the clinical state parameters(s) and/or clinical outcome parameter(s) are automatically generated by the data-discovery process (e.g., as described with reference to act 106) and/or are obtained from a predefinition (e.g., stored in a data storage device). Alternatively, the knowledge-driven variable(s), the clinical state parameters(s) and the clinical outcome parameter(s) are manually selected.

The clinical state parameter(s), the clinical outcome parameter(s), and the knowledge-drive variable(s) are computed based on data stored in electronic health records of a population of patients (e.g., 216A).

The clinical state parameter(s) and/or the clinical outcome parameter(s) and/or the knowledge-drive variable(s) may be selected from a common set of available data. The clinical state parameter(s) and/or the clinical outcome parameter(s) and/or the knowledge-drive variable(s) may be defined as a set-of-rules, and/or conditions based on values of data entries stored in the electronic health record of the patient. For example, blood pressure >140/90, "previous heart attack"=YES, "all antibiotics administered within 72 hours of admission".

The clinical state parameter(s) and/or the clinical outcome parameter(s) and/or the knowledge-drive variable(s) may be extracted from values of fields stored in electronic health records, and/or computed based on the extracted values. For example, patient diagnosis, patient signs (e.g., based on evidence-based scales, and/or other clinical evaluation), patient symptoms, medical history (e.g., history of present illness, surgeries, other previous treatments), medication use (e.g., current prescriptions, previous prescriptions), illicit substance abuse, smoking history, total admission time, time spent at each ward, transfer to ICU, death, discharge with outpatient rehabilitation, and full recovery.

An anchoring location of each knowledge-driven node, each corresponding to one of the entered knowledge-driven variables, within a directed acyclic graph (DAG). The anchoring location may be a physical anchor location (e.g., absolute and/or relative pixel(s) location on the screen) and/or a logical anchor (e.g., location relative to other anchors, for example the first anchor, the second anchor. The order of the sequence of knowledge-driven is anchored. Each knowledge-driven node may be defined as being before, after, or in parallel to other knowledge-driven node(s). The clinical state parameter(s) is represented by initial root node(s) of the DAG. The outcome parameter(s) may denote, for example a final leaf node(s) of the DAG and/or other indication of a last event. The anchoring location of the knowledge-driven nodes is selected between the initial node(s) and the final node(s) of the DAG. It is noted that additional data-drive clinical pathways may be explored after the final leaf node(s) when the outcome parameter(s) may be set as an indication of a temporary final event which is not indicative of a terminal final event.

The location of the automated data-driven discovery of events relative to the anchored knowledge-driven nodes. The automated data-driven discovery may be defined as: before, after, and/or in-between the knowledge-driven nodes. It is noted that there may be no automated data-discovery between nodes, for example two knowledge-driven nodes may be anchored sequentially, with no automated data-discovery occurring between the knowledge-driven nodes. The automatic computation of the data-driven discovery of events is performed according to the manual designation.

At 104, data of the sampled population (selected according to the clinical state parameter(s)), optionally obtained from the electronic health records of the sampled individuals, may be pre-processed. The pre-processing may be performed to format the data for computation of the data-driven discovery of event types, as described with reference to act 106.

Optionally, the data of the sampled population includes longitudinal event data, including a history of values for one or more fields of the electronic health record. For example, a history of hemoglobin values for multiple blood tests performed over the last 5 years, or a previous diagnosis that was removed after an administered medical treatment. Optionally, the data of the sampled population is associated with a timestamp for each value and/or instance.

Optionally, the data of the sampled population is associated with an event type, for example, as a tag, and/or metadata. For example, the data value of Hemoglobin <117 may be mapped to an event type called "HEMOGLOBIN-LOW".

Exemplary patients' records include the following data: patientID, timestamp, event type, and/or multi-dimensional attributes.

The pre-processing may be performed for each patient of the sampled population.

The pre-processing may include the following exemplary process: computing a vector of values for the selected knowledge-driven variables, obtained from raw historical event data (e.g., stored in the electronic health records) prior to an index date associated with occurrence of the initial state. Each knowledge-driven variable may include binary and/or categorical values. For example, for an initial state of entering the emergency room with chest pain, and a knowledge-driven variable of treatment with interventional placement of a cardiac stent, a value indicative of whether or not the patient was previously treated with a cardiac stent prior to entering the emergency room with chest pain is stored in the vector. In another example, when the knowledge-driven variable includes a measured blood pressure, the history of blood pressure values prior to entering the emergency room may be stored in the vector. A sequence of target events of interest and/or metrics may be computed as attributes of the target events. Every node (or subset of nodes) may present some statistical data about patients (e.g., all patient, most patients) flowing through the respective node. For example, the HbA1c level prior to a certain administered treatment associated with the node. The average HbA1c may be computed from the HbA1c level of the patients, and presented in association with the node. The value of the clinical outcome parameter(s) at an associated outcome index date is computed (e.g., as binary and/or categorical value).

At 106, the data-driven discovery of event types is automatically computed according to the manual selections.

Individual clinical pathways are computed for each of the sampled population of patients based on the discovered data-driven nodes. The individual clinical pathways may be stored as a linked list, or other sequential data structure. The discovered data-driven nodes are automatically inserted after the initial node. It is noted that individual clinical pathways of different patients of the sample patient population may not necessarily pass through the anchored knowledge-driven nodes and/or the outcome node. For example, when the certain patient was not treated by the treatment defined by the anchored knowledge-driven nodes and/or did not experience the clinical outcome defined by the outcome node. Such individual pathways that do not pass through manual defined node(s), when aggregated into the cohort DAG with other individual pathways that do pass through manual defined node(s), present an overall picture of the percentage of the sample population which do and do not pass through the manual defined node(s), as described herein in additional detail.

The data-driven discovery of events is optionally implemented based on temporal sequence mining of the electronic health records. Each discovered event type is associated with a respective node.

The discovered data-driven nodes represent, for example, a medical drug-based treatment, a medical intervention procedure, and a certain clinical state. Exemplary discovered data-driven nodes may include for example, a new and/or change in patient diagnosis, new and/or change in patient signs (e.g., based on evidence-based scales, and/or other clinical evaluation), patient symptoms, new and/or change in medication use (e.g., current prescriptions, previous prescriptions), new and/or change in ward, transfer to ICU, emergency surgery, and emergency resuscitation procedure. An exemplary method for performing data-driven discovery is described with reference to *Adam Perer, Fei Wang, and Jianyin Hu, "Mining and exploring care pathways from electronic medical records with visual analytics", Journal of Biomedical Informatics* 56 (2015) 369-378.

At 108, the individual clinical pathways are aggregated to compute the DAG. For example, individual clinical pathways are summed together, according to common nodes.

The DAG includes multiple nodes connected by links. Nodes including the initial node(s), the knowledge-driven node(s), the final node(s), and the discovered data-driven nodes. Each discovered data-driven node denotes a respective discovered data-driven event type. Each link denotes an automatically discovered sequence between two consecutive event types.

Intermediate nodes of the DAG, located between the initial node(s), the knowledge-driven node(s), and/or the final node(s), denote the data-driven discovered event types.

Links between nodes denote data-driven discovered sequences between event types denoted by the linked nodes.

Links and/or nodes of the DAG are associated with statistics (e.g., as metadata, tags, stored in a database linked to the DAG) computed by aggregation of data from the individual pathways from which the links and/or nodes of the DAG correspond to. Exemplary statistics include: number of individual patients of the sampled population associated with the respective link and/or node (e.g., absolute number, percent of the sampled population), and a measure of central tendency computed for a value associated with the respective link and/or node associated with the sub-set of patients (e.g., average value). For example, the average HbAlc level prior to starting a treatment regimen.

Optionally, the aggregation of the individual clinical pathways is performed by computing unique sequences of nodes across the individual clinical pathways of the sampled population of patients. The unique sequences of nodes may include two or more data-driven node that are linked to one another. Each unique sequence may be tagged. Each unique sequence represents one sub-path of the DAG, denoting, for example, one type of event (e.g., change in patient clinical state, medical treatment). Repetition of evens may be detected, and analyzed to determine whether the repetition of the event represents a new node in the graph, or whether the repetition is to be ignored. For example, a certain patient visiting different physicians may receive the same diagnosis by the different doctors, in which case, additional nodes of the same diagnosis may be ignored. In another example, the certain patient is re-prescribed additional medication of the same type (e.g., each time given a 3 month supply) in which case, additional nodes of the same medication may be ignored. The number of patients for each discovered unique sequence node is computed, for example, according to the number of individual clinical pathways that include the unique sequence. Patient level metrics at each discovered unique sequence node are aggregated. For example, the percentage of patients that obtained the final selected outcome, the average value associated with the unique sequence (e.g., average hemoglobin value for a node associated with an administered blood transfusion).

Nodes of individual clinical pathways may be associated with timestamps indicative of time of occurrence of the event represented by the respective node. For example, when the change in mini mental status exam score has been recorded. The individual clinical pathways may be aggregated to compute the DAG according to the timestamps. For example, patients that experienced similar changes in mini mental status exam scores during a similar time range following admission. In another example, patient outcomes occurring at a common time interval (e.g., 7 days post admission) are aggregated.

At 110, a visual diagram is computed based on the DAG for presentation within the GUI. Optionally, a Sankey-based diagram is computed according to the DAG, and presented within the GUI.

Optionally, a height of a respective node and/or link of the visual diagram corresponds to a relative number of sub-set of patients of the sampled population having individual pathways passing through the respective node and/or link.

Optionally, the links of the visual diagram are color coded according to a color coding scheme denoting the relative ratio of the sampled population meeting a certain clinical outcome value of the clinical outcome variable.

Optionally, nodes of a common depth (e.g., number of nodes away from the initial node) are clustered, and presented along a common layer. Each layer denotes a respect depth, for example, the initial node is located at zero alone an x-axis, and each layer is located at a respective sequentially increasing value along the x-axis.

Optionally, the visual diagram (e.g., Sankey-based diagram) is computed according to the exemplary process, including traversing the DAG depth first, and assigning the computed depth to each respective node. An arrangement of clusters of nodes is presented within the GUI. Each cluster includes nodes of a common depth. The computed depth may include a fixed depth value indicative of the last knowledge-driven node encountered in the DAG for the respective node, and/or a variable depth value indicative of depth between knowledge-driven nodes. The initial value for the fixed depth may be set to 0, and incremented by 1 whenever a new knowledge-driven node is encountered during the traversal. The initial value for the variable depth may be set to 0 and each time the fixed depth is updated. The variable depth may be updated to the maximum number of incoming links +1. The variable depth may be assigned to a maximum value for nodes without outgoing links. The links between the nodes of each cluster are presented within the GUI.

The following is an exemplary implementation of a process, shown as pseudo-code (e.g., stored as code instructions executable by one or more hardware processors) for converting the DAG to a Sankey-based diagram:

Assign nodes positions:
Loop from 0 to last fixedDepth encountered
   Fetch all nodes at current fixedDepth level
   Sort by variableDepth and loop through nodes
     Assign x position of nodes based on fixedDepth and variableDepth;
     Assign y position based on loop index (or minimizing crossed links strategy)
Draw nodes based on above positions
Draw links based on above source/target nodes positions At 112, the DAG and/or the visual diagram (e.g., Sankey-based) is presented within the GUI on the display.

At 114, one or more navigation and/or visual formatting instructions are received via the GUI.

Optionally, a manual collapse instruction is received. The collapse may be defined for certain nodes and/or links, and/or for all nodes and/or links. The data-driven event type nodes and/or links of the DAG and/or visual diagram selected for collapse are aggregated. The collapsing instructions triggers creation of the DAG and/or visual diagram depicting direct flows between the initial node(s), the knowledge-driven node(s), and the final node(s). Collapsed data-driven nodes are not depicted.

At 116, one or more of the manual selections performed with reference to act 102 are adjusted, for example, a new selection is made, an existing selection is cancelled, and/or an existing selection is adjusted to another selection. Features described with reference to one or more of acts 104-114 may be iterated, to create new and/or adjusted DAGs and/or visual diagrams. For example, the user may initially select broad values to study a large population of patients. Clinically interesting values may be selected during subsequent iterations for reducing the patient population, and/or to focus the clinical pathways on narrow treatment options.

Figure 3:
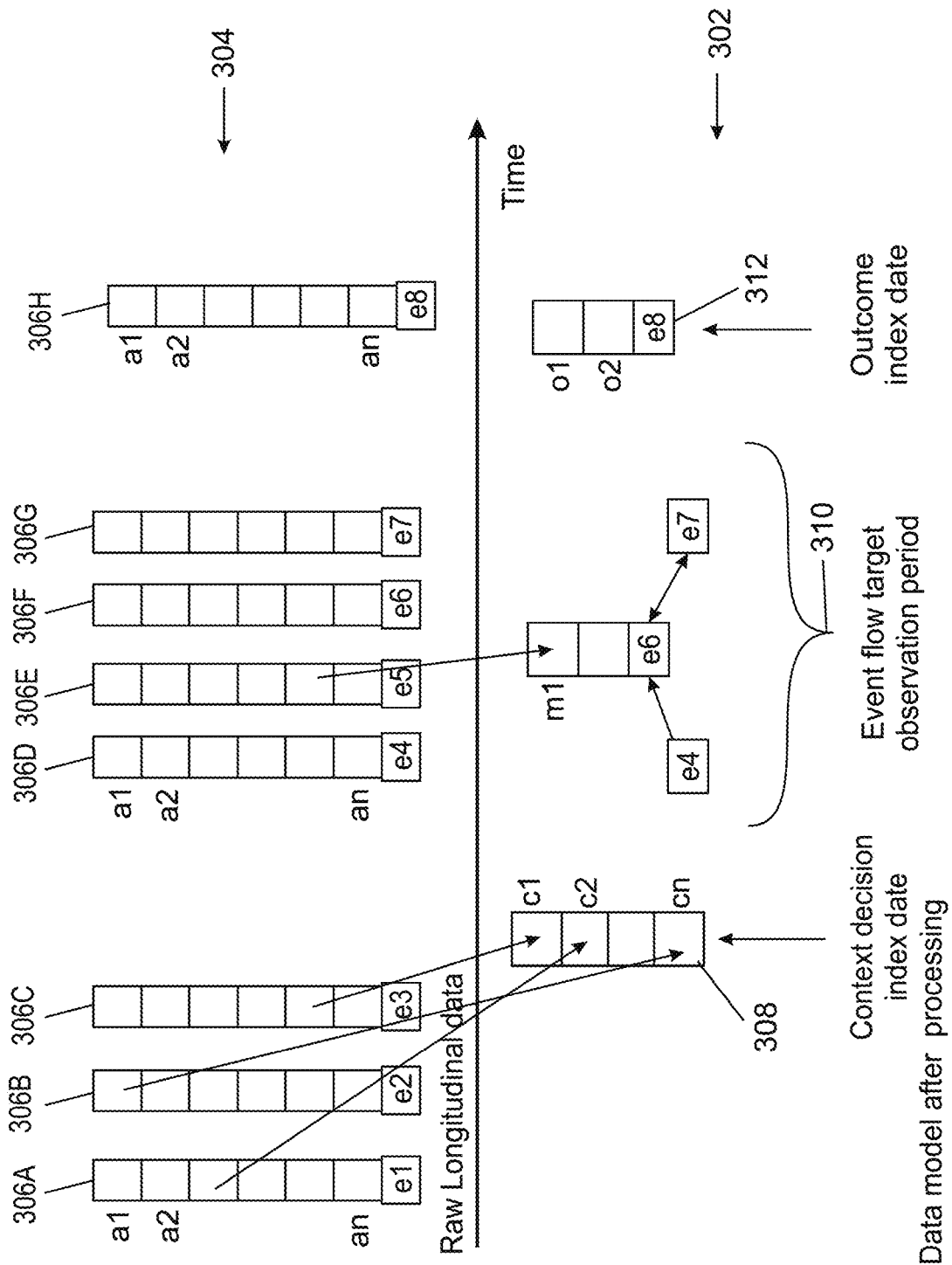
FIG. 3 is a schematic depicting an exemplary process of computing nodes from raw historical patient data, in accordance with some embodiments of the present invention.

Reference is now made to FIG. 3, which is a schematic depicting an exemplary process of computing nodes 302 from raw historical patient data 304, in accordance with some embodiments of the present invention. Historical patient data 304, for example, electronic health records 306A-H, store values of data fields at different points in time. Each electronic health record 306A-H includes a time stamp e1-e8 indicative of the time of the stored data. Values of data fields a1-an (e.g., blood test results, diagnosis, other clinical measurements such as blood pressure) may vary over time. For example, different measurements of hemoglobin may be obtained by blood tests performed over a period of time.

Initial node 308 stores one or more of the manually selected clinical state parameters denoting the initial clinical state of the patient c1-cn, which are obtained from respective fields of health records e1-e3. The time stamp of the electronic health record defining the initial node may denote an index date indicative of a start clock measuring the length of time of the clinical pathway computed for the individual.

Knowledge-driven node 310 stores a change in clinical state of the patient, defined by the transition of values from e4→e6→e7, for example, emergency room visit→triage→admission to internal medicine ward. Knowledge-driven node 310 may store an indication of the state, for example, obtained from another health record e5 which is associated with the change in clinical state of the patient, for example, a diagnosis of pneumonia, which explains why the patient was transferred from the emergency room to the internal medicine ward. The change in clinical state may be defined over an event flow observation period, for example, 1 hour, 4 hours, 12 hours, 24 hours, or other period of time.

Final node 312 stores one or more of the clinical outcome parameters o1-o2 obtained from electronic health record e8. The time stamp of the electronic health record defining the final node may denote an outcome index date indicative of an end of the length of time of the clinical pathway computed for the individual.

Figure 4:
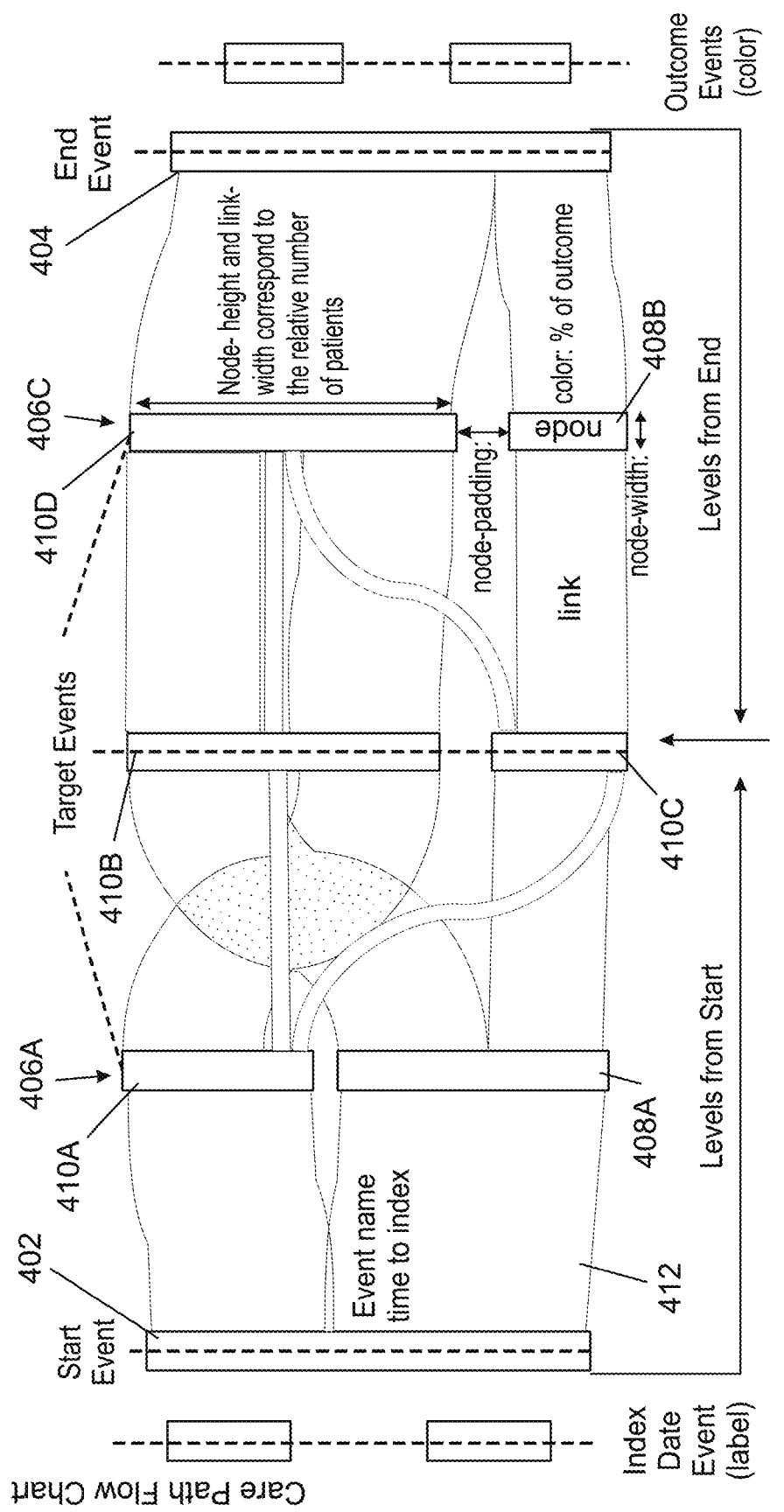
FIG. 4 is a schematic depicting an example of a Sankey-based diagram computed from the cohort clinical pathway DAG presented within the GUI, in accordance with some embodiments of the present invention.

Reference is now made to FIG. 4, which is a schematic depicting an example of a Sankey-based diagram computed from the cohort clinical pathway DAG presented within the GUI, in accordance with some embodiments of the present invention. An initial node 402 denotes the sample population of patients according to the manually selected clinical state parameter(s), as described herein. A final node 404 denotes the final state of the patients according to the manually selected clinical outcome parameter(s), as described herein. The Sankey-based diagram is arranged according to clusters 406A-C that include nodes of a common depth. Knowledge-driven nodes 408A-B are anchored in position, as described herein. Data-driven nodes 410A-D are computed and sequentially positioned based on data-driven approaches by mining the health record of the sample patient population, as described herein. Links 412 between nodes are automatically discovered by the data-driven process, as described herein.

Optionally, links 412 are color coded according to the percent of the initial sample patient population that achieved a predefined outcome.

Optionally, the height of the nodes and/or thickness of the links corresponds to the percent of the initial sample patient population that have individual clinical pathways that include the respective link and/or node.

Figure 5:
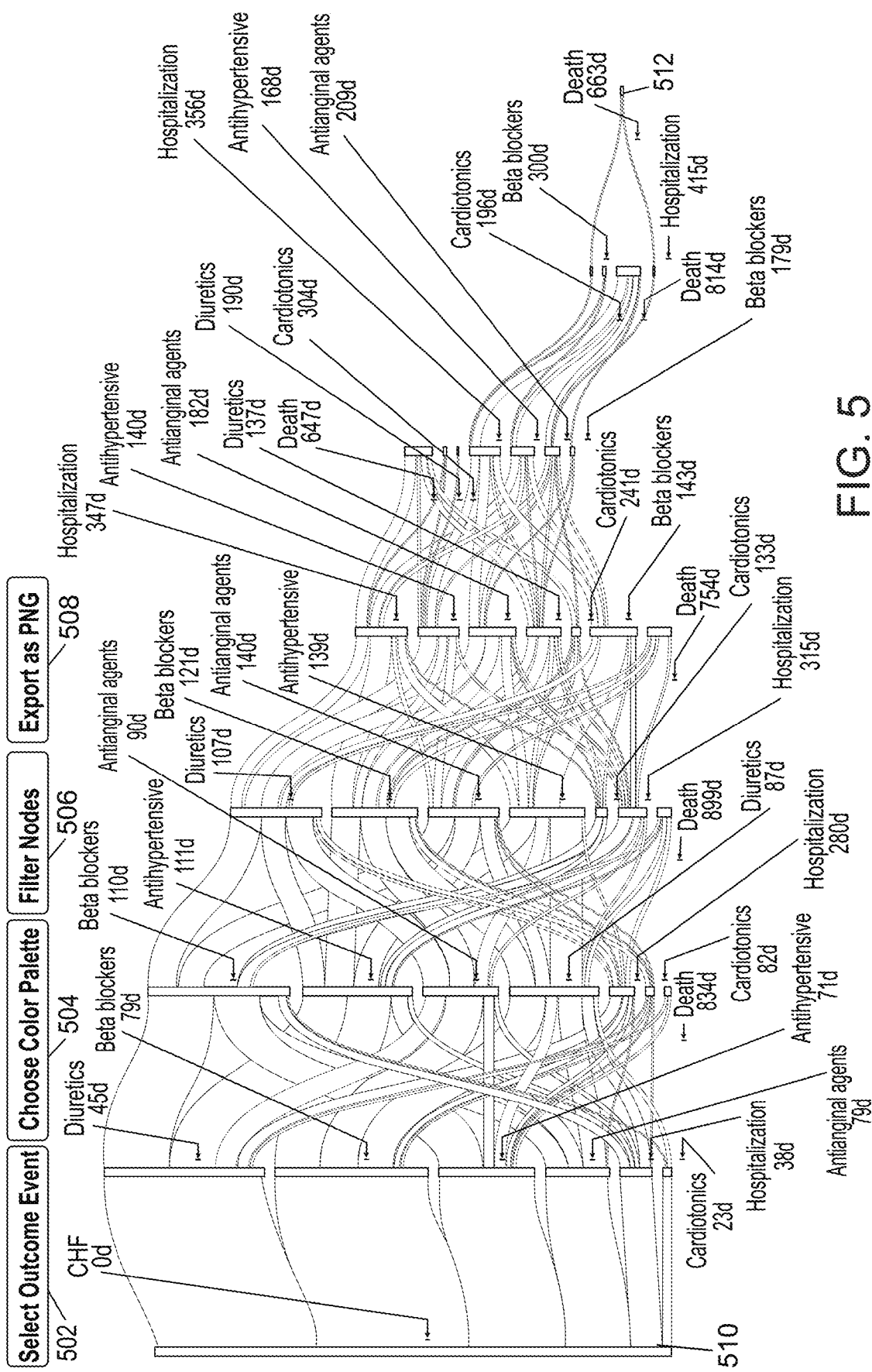
FIG. 5 is a schematic of an example of another Sankey-based diagram computed from the cohort clinical pathway DAG presented within the GUI, in accordance with some embodiments of the present invention.

Reference is now made to FIG. 5, which is a schematic of an example of another Sankey-based diagram computed from the cohort clinical pathway DAG presented within the GUI, in accordance with some embodiments of the present invention. GUI may include an icon 502 for manual selection of an outcome event, an icon 504 for definition of colors of links, an icon 506 for filtering of nodes (e.g., collapsing of nodes, redefining the knowledge-driven nodes), and an icon 508 for exporting of the diagram as a PNG file.

The Sankey-based diagram includes an initial node 510 defining the sample population of patients as patients with congestive heart failure (CHF), and a final node 512 defining the subset of the sample population that died. Intermediate nodes between initial node 510 and final node 512 include anchored knowledge-driven nodes and automatically discovered data-driven nodes that are linked by automatically computed color coded links, as described herein. Nodes are clustered according to depth, as described herein. Nodes are labeled with a textual label indicative of an administered treatment (e.g., diuretics, beta blocks, hospitalization, and the like) and an average time of the administered treatment relative to the diagnosis of CHF.

The descriptions of the various embodiments of the present invention have to been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant GUIs will be developed and the scope of the term GUI is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer-implemented method of creating a cohort clinical pathway graph based on knowledge-driven manual user input and automated data-driven mining within a graphical user interface (GUI) presented on a display associated with a computing device, the method comprising:
   receiving, via the GUI a plurality of manual selections including:
      at least one knowledge-driven variable denoting clinically significant values representing elements of a clinical decision making process, and
      an anchoring location of each knowledge-driven node denoting a respective knowledge-drive variable within a directed acyclic graph (DAG);
   computing individual clinical pathways for each of the sampled population of patients by automatically computing data-driven nodes denoting the data-driven discovery of event types relative to the plurality of manual selections; and
   aggregating the individual clinical pathways to compute a cohort clinical pathway DAG, wherein the cohort clinical pathway DAG includes a plurality of nodes comprising the knowledge-driven nodes, the data-driven nodes, and links connecting the plurality of nodes, each link denoting an automatically discovered sequence between two respective nodes;
   computing a depth for each node of the plurality of nodes; and
   presenting, within the GUI, an arrangement of clusters of nodes, wherein each cluster includes nodes of the plurality of nodes having a common depth.

2. The method according to claim 1, wherein a Sankey-based diagram is computed according to the cohort clinical pathway DAG, and presented within the GUI.

3. The method according to claim 1, wherein a height of a respective node and/or link of the cohort clinical pathway DAG corresponds to a relative number of sub-set of patients of the sampled population having individual pathways passing through the respective node and/or link.

4. The method according to claim 1, wherein the links are color coded according to a color coding scheme denoting the relative ratio of the sampled population meeting a certain clinical outcome value of the clinical outcome variable.

5. The method according to claim 1, further comprising, receiving, via the GUI one or both of the following manual selections:
   at least one clinical state parameter denoting an initial clinical state of a sample population of patients;
   at least one clinical outcome parameter denoting a final state of at least one patient of the sample population;
   wherein the at least one clinical state parameter denotes an initial root node of the DAG, and the at least one outcome parameter denotes a final leaf node of the DAG,
   wherein the plurality of nodes of the cohort clinical pathway DAG comprise the initial root node, and the final leaf node.

6. The method according to claim 5, wherein the at least one clinical state parameter, the at least one clinical outcome parameter, and the at least one knowledge-driven variable are denoted as one or more conditions of values of entries stored in electronic health records of patients.

7. The method according to claim 5, wherein the at least one clinical state parameter, the at least one clinical outcome parameter, and the at least one knowledge-drive variable are computed based on data stored in one or more of: electronic health records of a population of patients, medical insurance claims of the population of patients, and billing data of the population of patients.

8. The method according to claim 1, further comprising presenting within the GUI, the links between the plurality of nodes at each cluster,
   wherein computing a depth for each node of the plurality of nodes includes traversing the cohort clinical pathway DAG depth first.

9. The method according to claim 1, wherein the computed depth includes one or both of: a fixed depth value indicative of the last knowledge-driven node encountered in the cohort clinical pathway DAG for the respective node, and a variable depth value indicative of depth between knowledge-driven nodes.

10. The method according to claim 1, wherein intermediate nodes of the cohort clinical pathway DAG denote the data-driven discovered event types, and links between nodes denote data-driven discovered sequences between event types denoted by the linked nodes.

11. The method according to claim 1, wherein links and/or nodes of the cohort clinical pathway DAG are associated with statistics computed based on the individual pathways from which the links and/or nodes were aggregated from.

12. The method according to claim 11, wherein the statistics include at least one of: number of individual patients of the sampled population associated with the respective link and/or node, and a measure of central tendency computed for a value associated with the respective link and/or node associated with the sub-set of patients.

13. The method according to claim 1, wherein the aggregating comprises:
   computing unique sequences of nodes based on the individual clinical pathways;
   computing the number of patients for each discovered unique sequence; and
   aggregating patient level metrics for each unique sequence.

14. The method according to claim 1, further comprising receiving, via the GUI, a manual designation indicative of automated data-driven discovery of events at least one of: before, after, and in-between knowledge-driven nodes of the at least one knowledge-driven variables, wherein the automatically computing the data-driven discovery of events is performed according to the manual designation.

15. The method according to claim 1, further comprising, receiving via the GUI, a manual collapse instruction, and aggregating the data-driven event type nodes of the cohort clinical pathway DAG to create a collapsed cohort clinical pathway DAG depicting direct flows between the knowledge-driven nodes.

16. The method according to claim 1, wherein nodes of individual clinical pathway are associated with timestamps indicative of time of occurrence of the event represented by the respective node, wherein the individual clinical pathway are aggregated to compute the cohort clinical pathway DAG according to the timestamps.

17. The method according to claim 1, wherein the data-driven discovery of events is implemented based on temporal sequence mining of electronic health records of the sample population of patients.

18. The method according to claim 1, wherein data-driven nodes represent data selected from the group comprising: a medical drug-based treatment, a medical intervention procedure, and a certain clinical state.

19. A system for creating a cohort clinical pathway graph based on knowledge-driven manual user input and automated data-driven mining within a graphical user interface (GUI) presented on a display associated with a computing device, comprising:
   a non-transitory memory having stored thereon a code for execution by at least one hardware processor of the computing device, the code comprising:
   code for receiving, via the GUI a plurality of manual selections including:
      at least one knowledge-driven variable denoting clinically significant values representing elements of a clinical decision making process, and
      an anchoring location of each knowledge-driven node denoting a respective knowledge-drive variable within a directed acyclic graph (DAG);
   code for computing individual clinical pathways for each of the sampled population of patients by automatically computing data-driven nodes denoting the data-driven discovery of event types relative to the plurality of manual selections; and
   code for aggregating the individual clinical pathways to compute a cohort clinical pathway DAG, wherein the cohort clinical pathway DAG includes a plurality of nodes comprising the knowledge-driven nodes, the data-driven nodes, and links connecting the plurality of nodes, each link denoting an automatically discovered sequence between two respective nodes;
   code for receiving, via the GUI, a manual collapse instruction, and, in response to receiving the manual collapse instruction, aggregating the data-driven event type nodes of the cohort clinical pathway DAG to create a collapsed cohort clinical pathway DAG depicting direct flows between the knowledge-driven nodes; and
   code for presenting the collapsed cohort clinical pathway DAG within the GUI.

20. A computer program product for creating a cohort clinical pathway graph based on knowledge-driven manual user input and automated data-driven mining within a graphical user interface (GUI) presented on a display associated with a computing device, comprising:
   a non-transitory memory having stored thereon a code for execution by at least one hardware processor of the computing device, the code comprising:
   instructions for receiving, via the GUI a plurality of manual selections including:
      at least one knowledge-driven variable denoting clinically significant values representing elements of a clinical decision making process, and
      an anchoring location of each knowledge-driven node denoting a respective knowledge-drive variable within a directed acyclic graph (DAG);
   instructions for computing individual clinical pathways for each of the sampled population of patients by automatically computing data-driven nodes denoting the data-driven discovery of event types relative to the plurality of manual selections; and
   instructions for aggregating the individual clinical pathways to compute a cohort clinical pathway DAG, wherein the cohort clinical pathway DAG includes a plurality of nodes comprising the knowledge-driven nodes, the data-driven nodes, and links connecting the plurality of nodes, each link denoting an automatically discovered sequence between two respective nodes;
   instructions for receiving, via the GUI, a manual collapse instruction, and, in response to receiving the manual collapse instruction, aggregating the data-driven event type nodes of the cohort clinical pathway DAG to create a collapsed cohort clinical pathway DAG depicting direct flows between the knowledge-driven nodes; and
   instructions for presenting the collapsed cohort clinical pathway DAG within the GUI.

* * * * *